US008203478B1

(12) United States Patent
Huneycutt

(10) Patent No.: US 8,203,478 B1
(45) **Date of Patent: *Jun. 19, 2012**

(54) DISTRIBUTED AND COORDINATED ELECTRONIC WARFARE SYSTEM

(75) Inventor: Douglas S. Huneycutt, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 933 days.

This patent is subject to a terminal disclaimer.

(21) Appl. No.: 12/179,159

(22) Filed: Jul. 24, 2008

Related U.S. Application Data

(60) Provisional application No. 60/951,584, filed on Jul. 24, 2007.

(51) Int. Cl.
*G01S 7/36* (2006.01)

(52) U.S. Cl. ........................................... 342/14; 342/20

(58) Field of Classification Search ............... 342/13–20
See application file for complete search history.

(56) References Cited

U.S. PATENT DOCUMENTS 5,396,250 A 3/1995 Tsui et al.
2006/0164283 A1 * 7/2006 Karlsson ........................ 342/14
2006/0267827 A1 * 11/2006 Ferm et al. ..................... 342/14
2008/0191924 A1 * 8/2008 Duff et al. ...................... 342/14

OTHER PUBLICATIONS

Brainard, Timothy A., "U.S. Appl. No. 12/179,156 Office Action Jun. 22, 2011", , Publisher: USPTO, Published in: US.
Brainard, Timothy A., "U.S. Appl. No. 12/179,156 Advisory Action Jan. 10, 2012", , Publisher: USPTO, Published in: US.
Brainard, Timothy A., "U.S. Appl. No. 12/179,156 Office Action Oct. 27, 2011", , Publisher: USPTO, Published in: US.

* cited by examiner

*Primary Examiner* — Timothy A Brainard
(74) *Attorney, Agent, or Firm* — DeMont & Breyer, LLC

(57) ABSTRACT

A distributed and coordinated electronic warfare system is disclosed, which comprises a plurality of autonomous, geographically-distributed, mobile units (e.g., soldiers, vehicles, etc.), each of which carries an electronic warfare module. Each electronic warfare module comprises: a telecommunications transceiver for enabling the electronic warfare modules and their users to communicate with each other, and a threat-detection receiver for detecting potentially hostile radio signals, such as those that are used to detonate IEDs; and a jamming transmitter for transmitting sequences of electromagnetic pulses to interfere with potentially hostile radio signals, and an electronic warfare controller for coordinating the efforts of the electronic warfare modules.

9 Claims, 7 Drawing Sheets

DISTRIBUTED AND COORDINATED ELECTRONIC WARFARE SYSTEM

FIELD OF THE INVENTION

The present invention relates to electronics in general, and, more particularly, to electronic warfare measures and countermeasures.

BACKGROUND OF THE INVENTION

The presence of improved explosive devices ("IEDs") has hampered Allied efforts in the Global War on Terror. Many of the IEDs are detonated by remote control using radio signals, and, therefore, there is an urgent need for improved electronic warfare systems to defeat the radio signals that trigger the IEDs.

SUMMARY OF THE INVENTION

The present invention enables the distribution and coordination of electronic warfare assets in a novel and nonobvious manner. For example, the illustrative embodiment comprises a plurality of autonomous, geographically-distributed, mobile units (e.g., soldiers, vehicles, etc.), each of which carries an electronic warfare module.

Each electronic warfare module comprises:

a telecommunications transceiver for enabling the electronic warfare modules and their users to communicate with each other, and a threat-detection receiver for detecting potentially hostile radio signals, such as those that are used to detonate IEDs; and a jamming transmitter for transmitting sequences of electromagnetic pulses to interfere with potentially hostile radio signals, and an electronic warfare controller for coordinating the efforts of the electronic warfare modules.

The electronic warfare modules perform three salient functions:

1. they coordinate among themselves to ensure that the operation of the jamming transmitters and the telecommunications transmitters do not interfere with the telecommunications transceivers, and
2. they share among themselves the information gleaned from the threat-detection receivers to enhance the ability to detect, identify, and assess potentially hostile radio signals, and
3. they coordinate the efforts of the jamming transmitters to eliminate redundant efforts, channel jamming resources where needed, and to have different jamming transmitters cooperate to address individual threats.

The illustrative embodiment comprises a method comprising coordinating the transmission of a first sequence of electromagnetic pulses from a first transmitter at a first location and the transmission of a second sequence of electromagnetic pulses from a second transmitter at a second location to attack a first signal in a first geographic region in a first frequency band; wherein the first location and the second location are geographically diverse; and wherein the first sequence of electromagnetic pulses is temporally interleaved with the second sequence of electromagnetic pulses.

DETAILED DESCRIPTION

Figure 1:
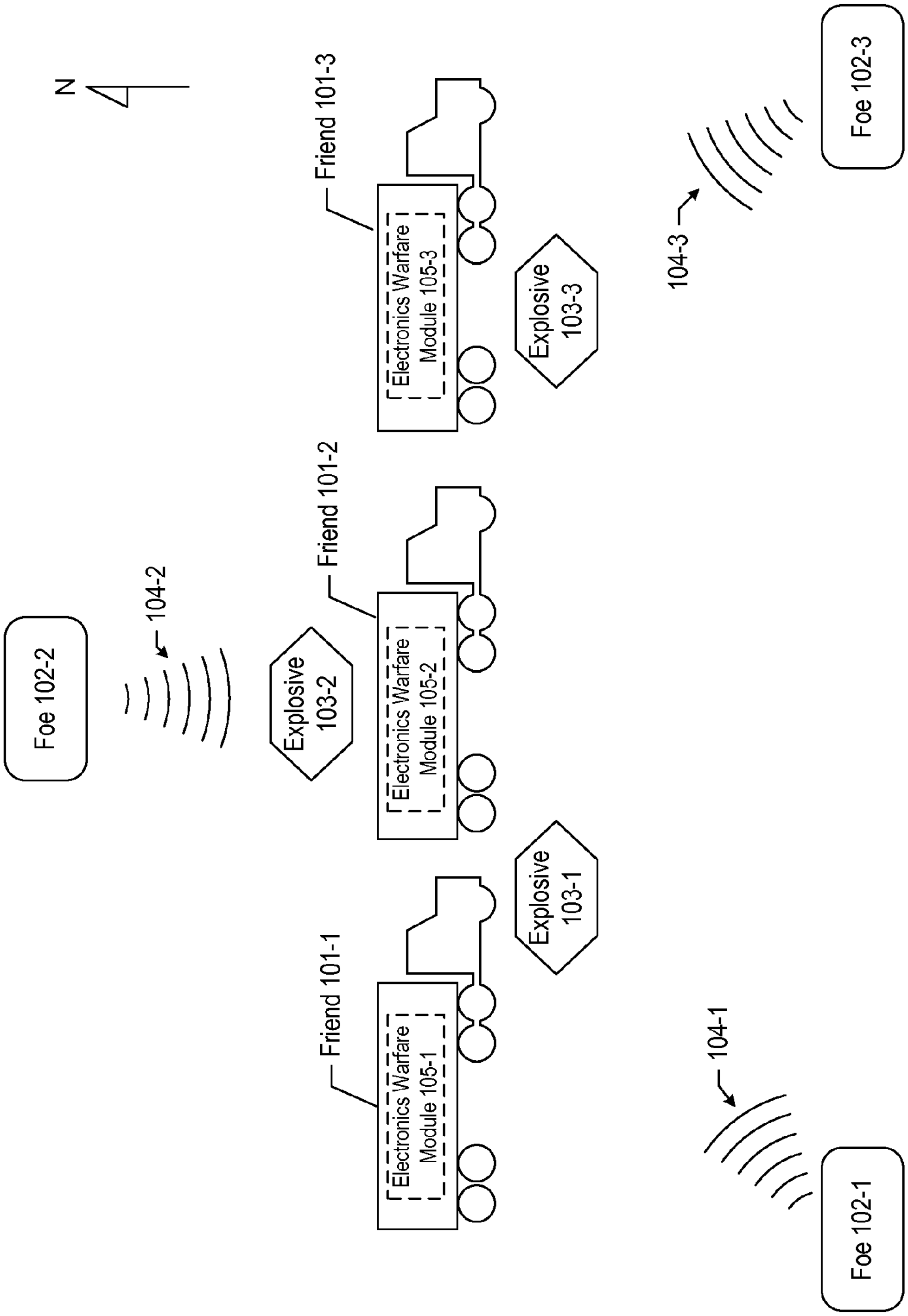
FIG. 1 depicts an aerial view of the salient aspects of a battlefield in accordance with the illustrative embodiment of the present invention.

FIG. 1 depicts an aerial view of the salient aspects of a battlefield in accordance with the illustrative embodiment of the present invention. The battlefield comprises: friends 101-1 through 101-3, foes 102-1 through 102-3, and explosives 103-1 through 103-3, situated as shown. Friends 101-1 through 101-3 constitute a convoy heading East through an area where foes 102-1 through 102-3 lie in ambush. Foe 102-1 controls the detonation of buried explosive 103-1 via radio signal 104-1, foe 102-2 controls the detonation of buried explosive 103-2 via radio signal 104-2, and foe 102-3 controls the detonation of buried explosive 103-3 via radio signal 104-3.

Although the illustrative embodiment depicts three friends, three foes, three explosives, and three radio signals, it will be clear to those skilled in the art, after reading this disclosure, how to make and use alternative embodiments of the present invention that comprise any number of friends, any number of foes, any number of explosives, and any number of radio signals. Although the illustrative embodiment depicts the three foes as surrounding or enveloping the friends, it will be clear to those skilled in the art, after reading this disclosure, how to make and use alternative embodiments of the present invention in which the friends, foes, and explosives have any spatial relationship.

In accordance with the illustrative embodiment, the battlefield is on land. It will be clear to those skilled in the art, however, after reading this disclosure, how to make and use alternative embodiments of the present invention in which:

i. some or all of the battlefield is on land, or ii. some or all of the battlefield is on water, or iii. some or all of the battlefield is in the air, or iv. some or all of the battlefield is in space, or v. any combination of i, ii, iii, and iv.

In accordance with the illustrative embodiment, friends 101-1 through 101-3, are land-based. It will be clear to those skilled in the art, however, after reading this disclosure, how to make and use alternative embodiments of the present invention in which:

i. some or all of friends 101-1 through 101-3 are land-based, or ii. some or all of friends 101-1 through 101-3 are naval-based, or iii. some or all of friends 101-1 through 101-3 are airborne, or iv. some or all of friends 101-1 through 101-3 are space-based, or v. any combination of i, ii, iii, and iv.

In accordance with the illustrative embodiment, foes 102-1 through 102-3, are land-based. It will be clear to those skilled in the art, however, after reading this disclosure, how to make and use alternative embodiments of the present invention in which:

i. some or all of foes 102-1 through 102-3 are land-based, or ii. some or all of foes 102-1 through 102-3 are naval-based, or iii. some or all of foes 102-1 through 102-3 are airborne, or iv. some or all of foes 102-1 through 102-3 are space-based, or v. any combination of i, ii, iii, and iv.

In accordance with the illustrative embodiment, explosives 103-1 through 103-3 are buried improvised explosive devices ("IEDs"). It will be clear to those skilled in the art, after reading this disclosure, how to make and use alternative embodiments of the present invention in which:

i. some or all of explosives 103-1 through 103-3 are land-based, or ii. some or all of explosives 103-1 through 103-3 are naval-based, or iii. some or all of explosives 103-1 through 103-3 are airborne, or iv. some or all of explosives 103-1 through 103-3 are space-based, or v. any combination of i, ii, iii, and iv.

In accordance with the illustrative embodiment, radio signals 104-1 through 104-3 are in mutually-exclusive radio frequency bands and occupy mutually-exclusive geographic regions. It will be clear to those skilled in the art, after reading this disclosure, how to make and use alternative embodiments of the present invention in which:

i. some or all of radio signals 104-1 through 104-3 are in overlapping radio frequency bands, or ii. some or all of radio signals 104-1 through 104-3 are in overlapping geographic regions, or iii. any combination of i and ii.

In accordance with the illustrative embodiment, each of friends 101-1 through 101-3 carry an electronics warfare module for communications, electromagnetic threat detection and electromagnetic countermeasures. Each of electronics warfare modules 105-1 through 105-3 is described in detail below and in the accompanying figures.

Figure 2:
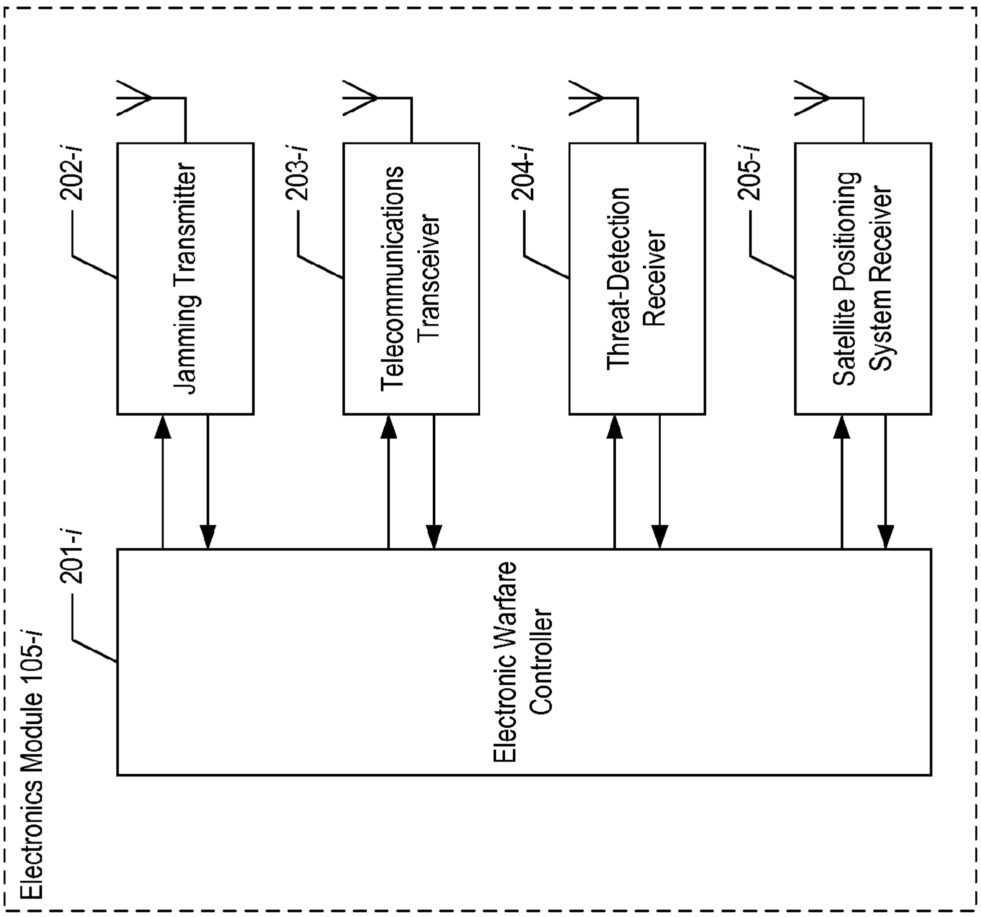
FIG. 2 depicts a block diagram of the salient components of electronics warfare module 105-*i* in accordance with the illustrative embodiment, wherein $i \in \{1, 2, 3\}$.

FIG. 2 depicts a block diagram of the salient components of electronics warfare module 105-*i* in accordance with the illustrative embodiment, wherein $i \in \{1, 2, 3\}$. Electronics warfare module 105-*i* comprises: electronic warfare controller 201-*i*, jamming transmitter 202-*i*, telecommunications transceiver 203-*i*, threat-detection receiver 204-*i*, and satellite positioning system receiver 205-*i*, interconnected as shown.

Electronic warfare controller 201-*i* comprises digital hardware and software for enabling electronic warfare controllers 201-1 through 201-3 to coordinate the operation of jamming transmitters 202-1 through 202-3, telecommunications transceivers 203-1 through 203-3, and threat-detection receivers 204-1 through 204-3. For example, the illustrative embodiment enables electronics warfare module 105-1 through 105-3 to coordinate their jamming and threat-detection efforts, and to ensure that the jamming and threat-detection efforts do not interfere with their respective telecommunications efforts. The operation of electronic warfare controller 201-*i* is described in detail below and in the accompanying figures.

Jamming transmitter 202-*i* comprises hardware and software for transmitting M sequences of electromagnetic pulses into N frequency bands in a geographic region, wherein M and N are positive integers (e.g., 1, 2, 3, 4, 5, 6, etc.). In accordance with the illustrative embodiment, the purpose for having jamming transmitter 202-*i* transmit sequences of electromagnetic pulses is to interfere with the electromagnetic signals transmitted by foes 102-1 through 102-3, but it will be clear to those skilled in the art that there are other purposes (e.g., non-lethal threat suppression, etc.). In accordance with the illustrative embodiment, the operation of jamming transmitter 202-*i* is controlled by electronic warfare controller 201-*i*, and electronic warfare controller 201-*i* monitors the operation and status of jamming transmitter 202-*i*. When jamming transmitter 202-*i* concurrently transmits a sequence of electromagnetic pulses into two or more frequency bands, the sequences are temporally interleaved. In accordance with the illustrative embodiment, the electromagnetic pulses transmitted by jamming transmitter 201-*i* is non-information bearing, but it will be clear to those skilled in the art, after reading this disclosure, how to make and use alternative embodiments of the present invention in which some or all of the electromagnetic pulses transmitted by jamming transmitter 201-*i* are information bearing. It will be clear to those skilled in the art how to make and use jamming transmitter 202-*i*.

Telecommunications transceiver 203-*i* comprises hardware and software for (1) enabling electronic warfare controller 201-*i* to communicate with electronic warfare controller 202-*j*, and (2) enabling the electronics warfare module 105-*i* to communicate with electronics warfare module 105-*j*, wherein $j \in \{1, 2, 3\}$ and $i \neq j$. It will be clear to those skilled in the art how to make and use telecommunications transceiver 203-*i*.

Threat-detection receiver 204-*i* comprises hardware and software for enabling electronics warfare module 105-*i* to detect electromagnetic signals 104-1 through 104-3 from foes and for reporting to electronic warfare controller 201-*i* the parameters for all of the signals that it detects. In accordance with the illustrative embodiment, threat-detection receiver 204-*i* is omni-directional, but it will be clear to those skilled in the art, after reading this disclosure, how to make and use alternative embodiments of the present invention in which some or all of the threat-detection receivers have directional capabilities. It will be clear to those skilled in the art how to make and use threat-detection receiver 204-*i*.

Satellite positioning system receiver 205-*i* comprises hardware and software for enabling electronic warfare controller 201-*i* to determine its latitude, longitude, and altitude. It will be clear to those skilled in the art how to make and use satellite positioning system receiver 205-*i*.

Figure 3:
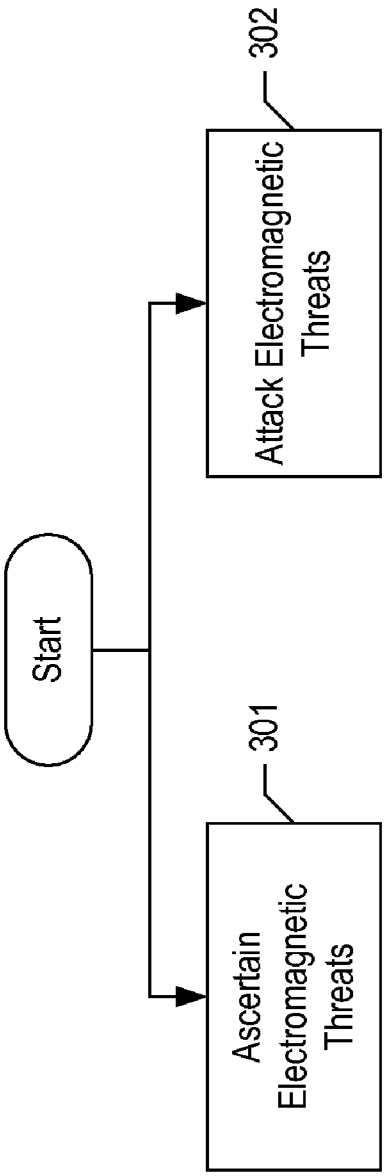
FIG. 3 depicts a flowchart of the salient tasks associated with the operation of the illustrative embodiment of the present invention.

FIG. 3 depicts a flowchart of the salient tasks associated with the operation of the illustrative embodiment of the present invention. In accordance with the illustrative embodiment of the present invention, tasks 301 and 302 are performed continually and concurrently, but it will be clear to those skilled in the art how to make and use alternative embodiments of the present invention in which the tasks are not performed continually or concurrently.

At task 301, electronic warfare modules 105-1 through 105-3 cooperate to detect, identify, and assess the electromagnetic signals transmitted by foes 102-1 through 102-3. Task 301 is described in detail below and in the accompanying figures.

At task 302, electronic warfare modules 105-1 through 105-3 cooperate to attack and neutralize the electromagnetic signals transmitted by foes 102-1 through 102-3. Task 302 is described in detail below and in the accompanying figures.

Figure 4:
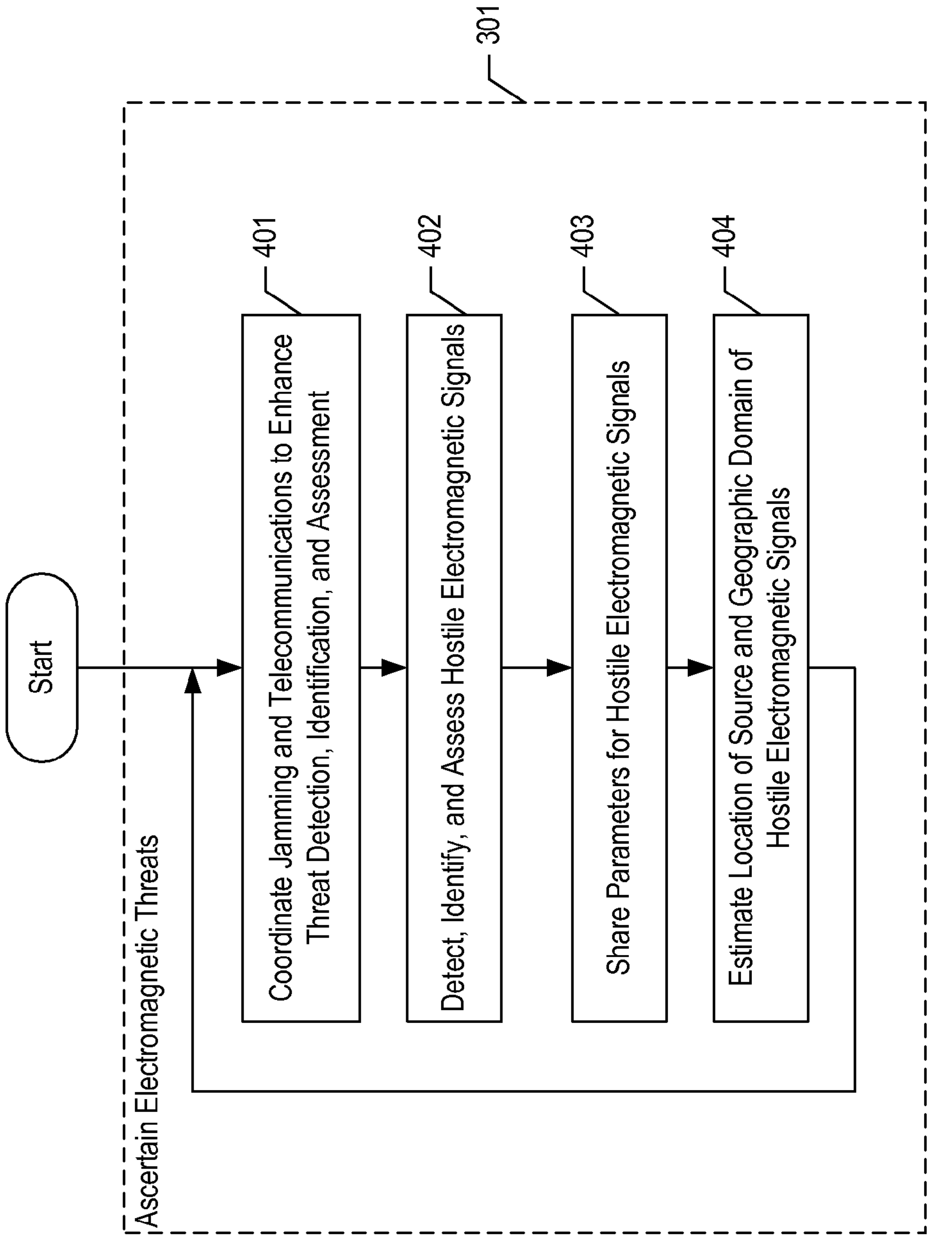
FIG. 4 depicts a flowchart of the salient tasks associated with the performance of task 301 in accordance with of the illustrative embodiment of the present invention.

FIG. 4 depicts a flowchart of the salient tasks associated with the performance of task 301 in accordance with of the illustrative embodiment of the present invention. To simplify the operation of the illustrative embodiment, tasks 401 through 404 are depicted as being performed in sequence, but it will be clear to those skilled in the art how to make and use embodiments of the present invention in which tasks 401 through 404 are performed concurrently.

At task 401, electronic warfare controllers 201-1 through 201-3 coordinate their respective jamming and telecommunications transmissions to enhance the likelihood of successful electromagnetic threat detection, identification, and assessment. In particular, electronic warfare controllers 201-1 through 201-3 coordinate when to turn off their jamming and telecommunications transmissions and what frequency bands to transmit into so as to enhance the ability of threat-detection receivers 204-1 through 204-3 to detect, identify, and assess electromagnetic threats. It will be clear to those skilled in the art, after reading this disclosure, how to make embodiments of the present invention that perform task 401.

At task 402, threat-detection receiver **204-*i* detects, identifies, and assesses electromagnetic signals from foes and reports to electronic warfare controller 201-*i* the parameters for all of the signals that it detects. It will be clear to those skilled in the art, after reading this disclosure, how to make embodiments of the present invention that perform task 402**.

At task 403, electronic warfare controllers 201-1 through 201-3 share the parameters for all of the signals detected in task 402. In accordance with the illustrative embodiment, all of electronic warfare controllers 201-1 through 201-3 share the parameters with each other, and, therefore, each is equally knowledgeable. It will be clear to those skilled in the art, however, after reading this disclosure, how to make and use alternative embodiments of the present invention in which all of the signal parameters are not shared with all of the electronic warfare controllers. It will be clear to those skilled in the art, after reading this disclosure, how to make embodiments of the present invention that perform task 402.

At task 404, electronic warfare controllers 201-1 through 201-3 estimate the location of the source of each of the detected signals through triangulation and a knowledge of each electronics module at the time the signal was detected. As part of task 404, electronic warfare controllers 201-1 through 201-3 also estimate the geographic domain within which the hostile signals can be received. This information is used in task 302 for deciding which signals need to be jammed and where. It will be clear to those skilled in the art, after reading this disclosure, how to make embodiments of the present invention that perform task 402.

Figure 5:
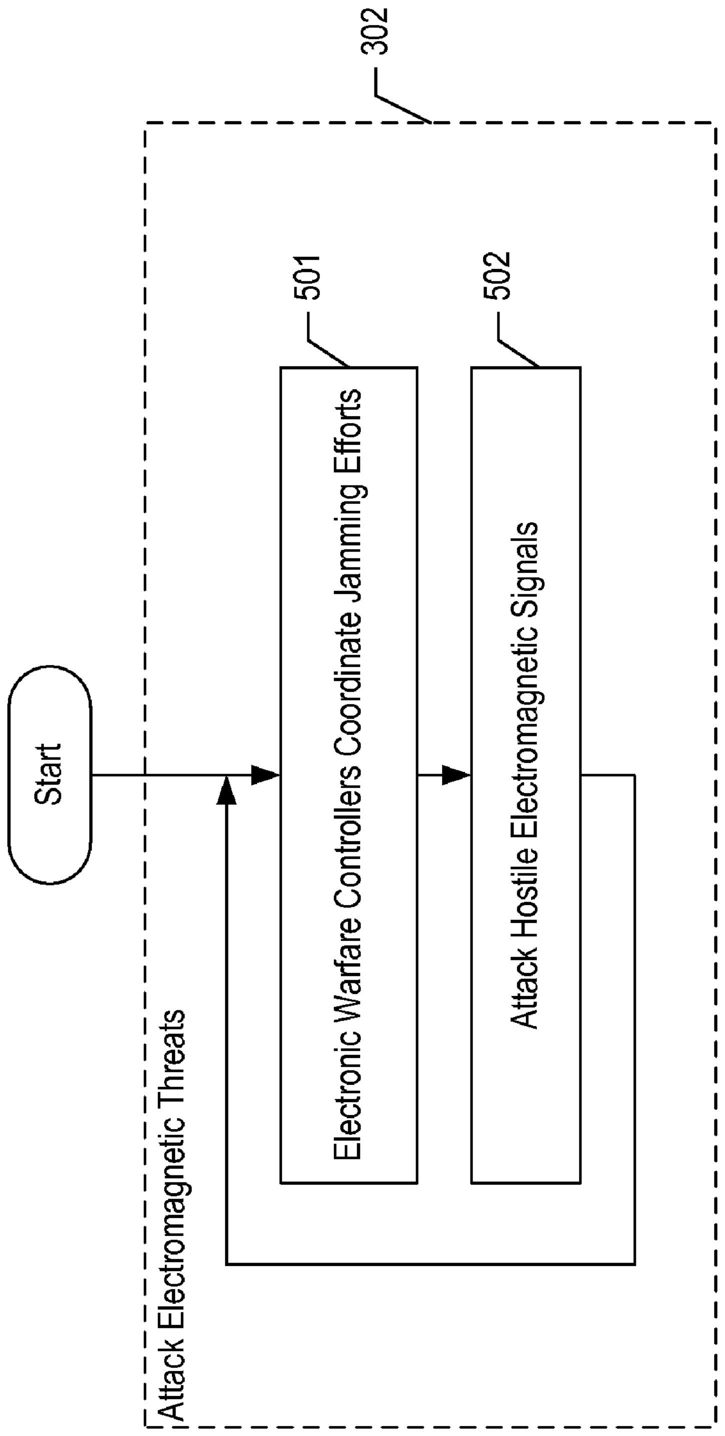
FIG. 5 depicts a flowchart of the salient tasks associated with the performance of task 302 in accordance with of the illustrative embodiment of the present invention.

FIG. 5 depicts a flowchart of the salient tasks associated with the performance of task 302 in accordance with of the illustrative embodiment of the present invention.

At task 501, electronic warfare controllers 201-1 through 201-3 communicate and coordinate to distribute the jamming efforts among jamming transmitters 202-1 through 202-3. As part of task 501, electronic warfare controllers 201-1 through 201-3 coordinate to assign, when and where advantageous, jamming transmitters to interfere with the hostile electromagnetic signals in their vicinity. Referring to FIG. 1, jamming transmitter 202-1 might be assigned to interfere with signal 104-1, jamming transmitter 202-2 might be assigned to interfere with signal 104-2, and jamming transmitter 202-3 might be assigned to interfere with signal 104-3.

Furthermore, as part of task 501, electronic warfare controllers 201-1 through 201-3 coordinate to assign, when and where advantageous, jamming transmitters to assist each other to interfere with the hostile electromagnetic signals. For example, jamming transmitter 202-1 and jamming transmitter 202-2 might be each be assigned the task of partially jamming enemy signals 104-1 and 104-2. This requires them to synchronize and coordinate when and where each is transmitting pulses into the frequency bands occupied by enemy signals 104-1 and 104-2. It will be clear to those skilled in the art, after reading this disclosure, how to make and use embodiments of the present invention that perform task 501.

At task 502, electronic warfare controllers 201-1 through 201-3 direct jamming transmitters to attack enemy signals 104-1 through 104-3. Task 502 is described in detail below and in the accompanying figure.

Figure 6:
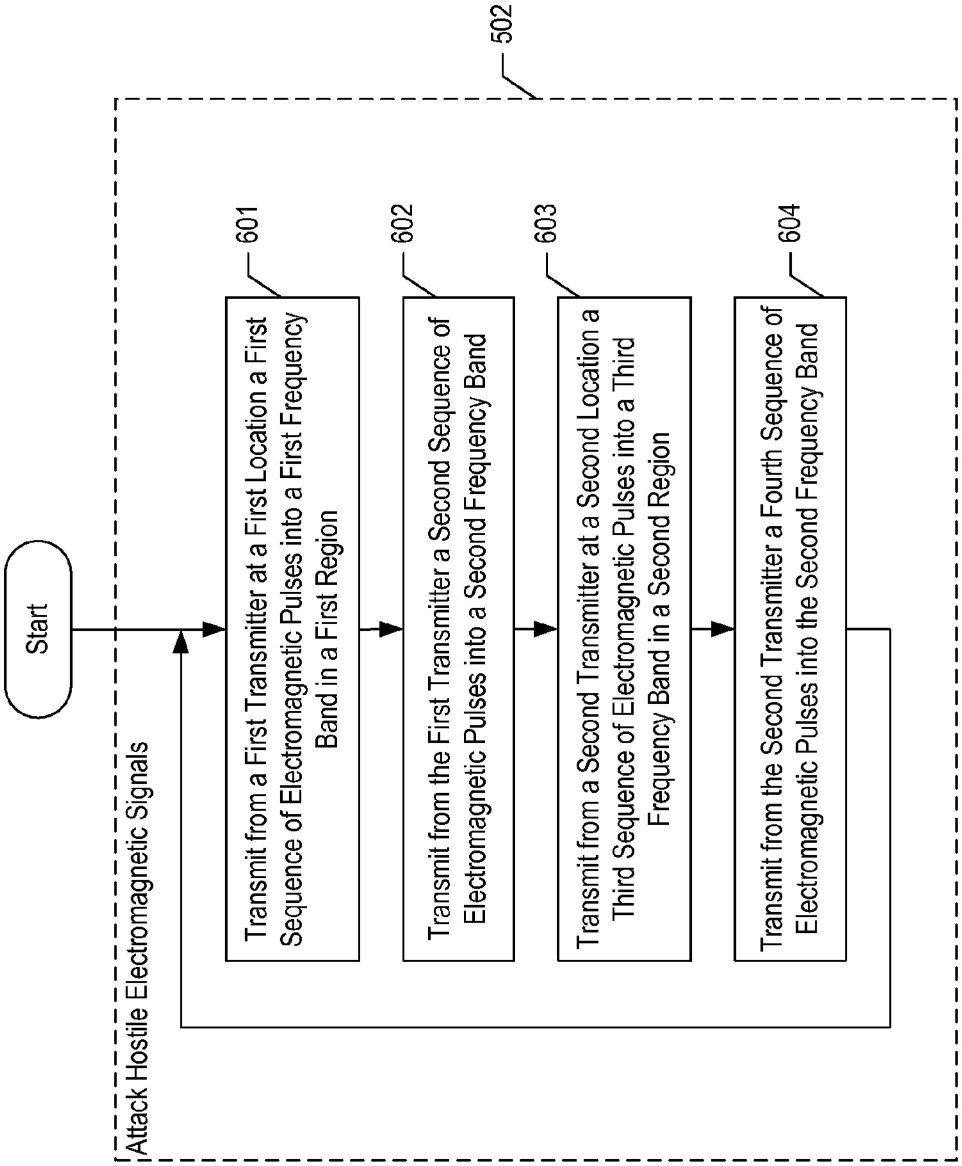
FIG. 6 depicts a flowchart of the salient tasks associated with the performance of task 502 in accordance with of the illustrative embodiment of the present invention.

FIG. 6 depicts a flowchart of the salient tasks associated with the performance of task 502 in accordance with of the illustrative embodiment of the present invention.

Figure 7:
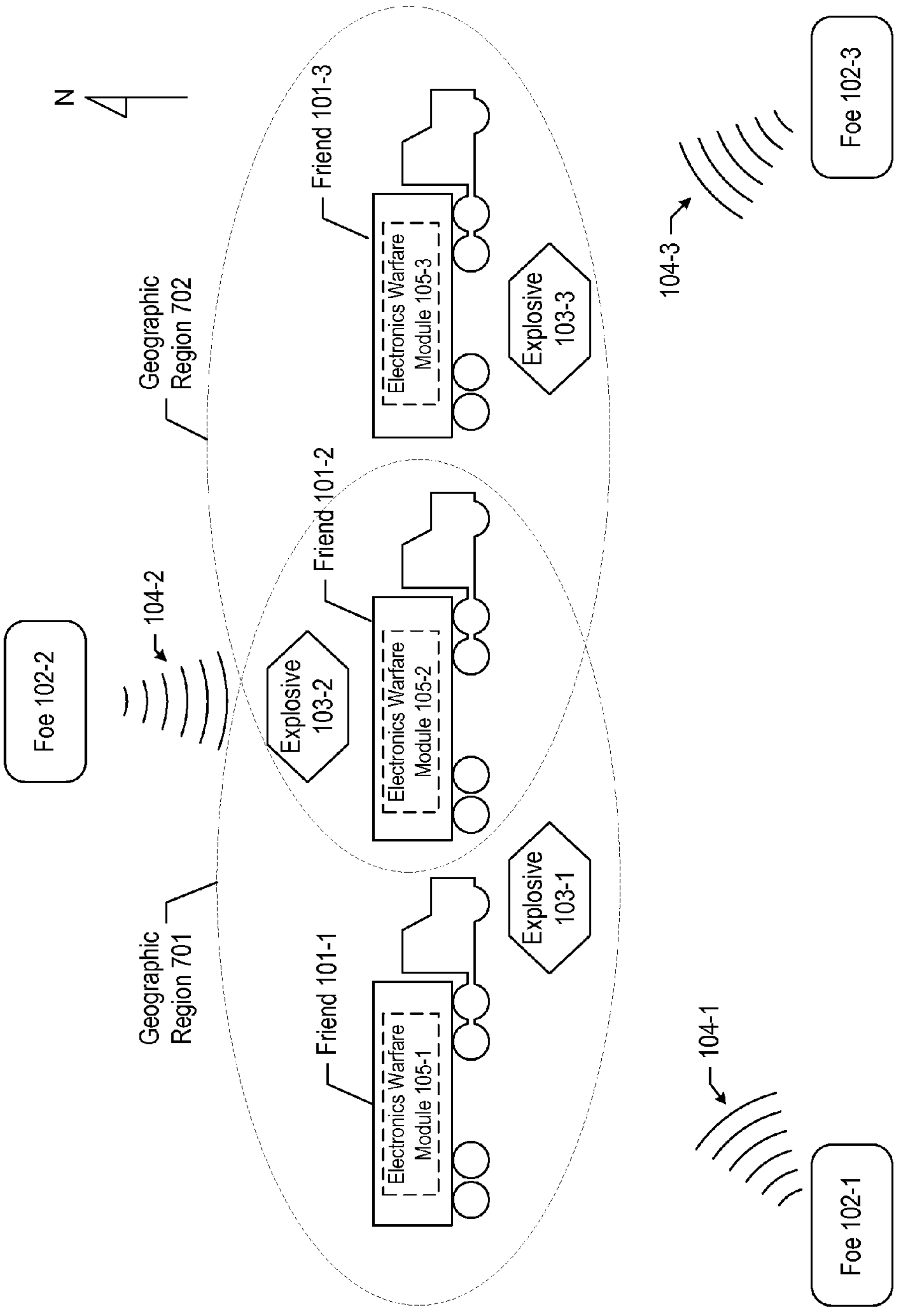
FIG. 7 depicts an aerial view of the salient aspects of a battlefield in accordance with the present invention in which the partially overlapping geographic regions protected by geographically-diverse jamming transmitters cooperate.

At task 601, jamming transmitter 102-1, which is at a first location, transmits a first sequence of electromagnetic pulses into a first frequency band to attack signal 104-1. Referring to FIG. 7, jamming transmitter 102-1 transmits the first sequence of electromagnetic pulses into region 701.

At task 602, jamming transmitter 102-1, while still at the first location, transmits a second sequence of electromagnetic pulses into a second frequency band to attack signal 104-2. Referring to FIG. 7, jamming transmitter 102-1 transmits the second sequence of electromagnetic pulses into region 701. In accordance with the illustrative embodiment, tasks 601 and 602 are concurrent and the first sequence and the second sequence are temporally interleaved.

At task 603, jamming transmitter 102-3, while at a second location, transmits a third sequence of electromagnetic pulses into a third frequency band to attack signal 104-3. Referring to FIG. 7, jamming transmitter 102-3 transmits the third sequence of electromagnetic pulses into region 702.

At task 604, jamming transmitter 102-3, while still at the second location, transmits a fourth sequence of electromagnetic pulses into the second frequency band to attack signal 104-2. Referring to FIG. 7, jamming transmitter 102-3 transmits the fourth sequence of electromagnetic pulses into region 702. In accordance with the illustrative embodiment, tasks 603 and 604 are concurrent. Furthermore, the second sequence, third sequence, and fourth sequences are temporally interleaved.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An electronics module comprising:

a jamming transmitter for transmitting electromagnetic pulses to interfere with an electromagnetic signal;

a telecommunications transceiver for telecommunications; and an electronic warfare controller for coordinating the jamming transmitter and the telecommunications transceiver to ensure that they do not interfere with each other, and for further coordinating with another electronics module to ensure that the operations of the electronics modules do not interfere with each other, wherein the electronics modules coordinate operations but no electronics module controls the operations of another electronics module.

2. The electronics module of claim 1 further comprising:

a threat-detection receiver for detecting electromagnetic signals;

wherein the electronic warfare controller also coordinates the threat-detection receiver to ensure that the jamming transmitter, the telecommunications transceiver, and the threat-detection transceiver do not interfere with each other.

3. The electronics module of claim 1 further comprising a satellite positioning system receiver.

4. An electronics module comprising:

a telecommunications transceiver for telecommunications;

a threat-detection receiver for identifying hostile electromagnetic threats; and an electronic warfare controller for coordinating the telecommunications transceiver and the threat-detection receiver to ensure that they do not interfere with each other, and for further coordinating with another electronics module to ensure that the operations of the electronics modules do not interfere with each other, wherein the electronics modules coordinate operations but no electronics module controls the operations of another electronics module.

5. The electronics module of claim 4 further comprising a satellite positioning system receiver.

6. A system comprising:

(1) a first electronics module comprising:

(1a) a first jamming transmitter, (1b) a first telecommunications transceiver, and (1c) a first electronic warfare controller for controlling the first jamming transmitter and the first telecommunications transceiver; and (2) a second electronics module comprising:

(2a) a second jamming transmitter, (2b) a second telecommunications transceiver, and (2c) a second electronic warfare controller for controlling the second jamming transmitter and the second telecommunications transceiver;

wherein the first electronic warfare controller and the second electronic warfare controller coordinate to ensure that the first jamming transmitter and the second jamming transmitter do not interfere with the first telecommunications transceiver and the second telecommunications transceiver;

wherein the first electronics module and the second electronics module coordinate operations but neither electronics module controls the operations of the other electronics module.

7. The system of claim 6 wherein the first electronics module further comprises (1d) a first threat-detection receiver; and wherein the first electronic warfare controller and the second electronic warfare controller coordinate to ensure that the first jamming transmitter, the second jamming transmitter, the first telecommunications transceiver, and the second telecommunications transceiver do not interfere with the first threat-detection receiver.

8. A system comprising:

(1) a first electronics module comprising:

(1a) a first threat-detection receiver, (1b) a first telecommunications transceiver, and (1c) a first electronic warfare controller for controlling the first threat-detection receiver and the first telecommunications transceiver; and (2) a second electronics module comprising:

(2a) a second threat-detection receiver, (2b) a second telecommunications transceiver, and (2c) a second electronic warfare controller for controlling the second threat-detection receiver and the second telecommunications transceiver;

wherein the first electronic warfare controller and the second electronic warfare controller coordinate to ensure that the first telecommunications transceiver and the second telecommunications transceiver do not interfere with the first threat-detection receiver and the second threat-detection receiver;

wherein the first electronics module and the second electronics module coordinate operations but neither electronics module controls the operations of the other electronics module.

9. The system of claim 8 wherein the first electronics module further comprises (1d) a first jamming transmitter; and wherein the first electronic warfare controller and the second electronic warfare controller coordinate to ensure that the first telecommunications transceiver, the second telecommunications transceiver, and the jamming transceiver do not interfere with the first threat-detection receiver and the second threat-detection receiver.

* * * * *